(12) United States Patent
Passke et al.

(10) Patent No.: US 6,889,451 B2
(45) Date of Patent: May 10, 2005

(54) FLUID SYSTEM WITH INTERNAL FILTER (75) Inventors: Joel L. Passke, Hillsboro, OR (US); Fred Dojan, Vancouver, WA (US)

(73) Assignee: Mike, Inc., Beaverton, OR (US)

( * ) Notice: Subject to any disclaimer, the term of this patent is extended or adjusted under 35 U.S.C. 154(b) by 226 days.

(21) Appl. No.: 10/421,279

(22) Filed: Apr. 23, 2003

(65) Prior Publication Data
US 2004/0211085 A1 Oct. 28, 2004

(51) Int. Cl.[7] .............................................. A43B 13/20
(52) U.S. Cl. ......................................... 36/29; 36/35 B
(58) Field of Search ........................... 36/29, 3 B, 3 R, 36/147, 35 B (56) References Cited

U.S. PATENT DOCUMENTS

| | | | | |
|---|---|---|---|---|
| 4,446,634 A | * | 5/1984 | Johnson et al. ................. 36/29 |
| 4,724,627 A | * | 2/1988 | Sisco ......................... 36/117.6 |
| 4,888,887 A | * | 12/1989 | Solow ........................... 36/3 R |
| 5,083,361 A | * | 1/1992 | Rudy ............................ 29/454 |
| 5,505,010 A | * | 4/1996 | Fukuoka ....................... 36/3 B |
| 5,564,143 A | * | 10/1996 | Pekar et al. .................... 5/708 |
| 5,826,349 A | * | 10/1998 | Goss ............................ 36/3 R |
| 5,993,585 A | * | 11/1999 | Goodwin et al. ............... 36/29 |
| 2002/0194747 A1 | * | 12/2002 | Passke et al. .................. 36/29 |

* cited by examiner

Primary Examiner—Ted Kavanaugh
(74) Attorney, Agent, or Firm—Banner & Witcoff, LTD (57) ABSTRACT The invention is a fluid system with an internal filter assembly that prevents particulate from moving between portions of the fluid system. The internal filter assembly is located within a fluid path extending between a particle source, such as a textile tensile member, and a portion of the fluid system that may be affected by particulates from the particle source, such as a value. The fluid system, and particularly the internal filter assembly, has applicability to articles of footwear, for example.

74 Claims, 8 Drawing Sheets

FLUID SYSTEM WITH INTERNAL FILTER

BACKGROUND OF THE INVENTION

1. Field of the Invention

The present invention relates to fluid systems. The invention concerns, more particularly, an internal filter assembly for a fluid system that restricts the movement of particulates located within the fluid system.

2. Description of Background Art

Articles of athletic footwear conventionally include two primary elements, an upper and a sole structure. The upper securely and comfortably receives the foot and is conventionally formed of foam, leather, and textile materials that are sewn or adhesively bonded together. The sole structure conventionally includes multiple layers that are referred to as an insole, midsole, and outsole. The insole is a thin, padded member located adjacent to the foot that improves the comfort of the footwear. The midsole forms the middle layer of the sole and often includes a resilient, foam material, such as polyurethane or ethylvinylacetate, that attenuates impact forces and absorbs energy when the footwear makes contact with the ground. The outsole is generally fashioned from a durable, wear resistant polymer and includes texturing to improve traction.

A midsole may also incorporate a fluid-filled bladder that provides enhanced impact force attenuation and energy absorption, as disclosed in U.S. Pat. No. 4,183,156 to Rudy, hereby incorporated by reference. Bladders of this type may include a plurality of chambers that are in fluid communication and extend throughout the heel portion or the forefoot portion of the midsole, for example. U.S. Pat. No. 4,219,945 to Rudy, also incorporated by reference, discloses a fluid-filled bladder encapsulated within a foam material. The combination of the bladder and the encapsulating foam material functions as a midsole. An upper may be attached to the upper surface of the encapsulating material and an outsole or tread member may be affixed to the lower surface, thereby forming an article of footwear.

Another type of prior art bladder utilized in footwear sole structures is disclosed in U.S. Pat. Nos. 4,906,502 and 5,083,361, both to Rudy, and both hereby incorporated by reference. The bladders are formed as a gas-pressurized structure that includes a hermetically sealed outer barrier layer that is securely bonded substantially over a double-walled fabric core. The double-walled fabric core has first and second outer fabric layers that are normally spaced apart from one another at a predetermined distance. Connecting members, potentially in the form of multi-filament yarns having many individual fibers, extend internally between the proximal or facing surfaces of the respective fabric layers. The individual filaments of the connecting members are anchored to the respective fabric layers to form tensile restraining means. A suitable method of manufacturing the double walled fabric structure is double needle bar Raschel knitting. U.S. Pat. Nos. 5,993,585 and 6,119,371, both issued to Goodwin et al., and both hereby incorporated by reference, disclose a fluid-filled bladder utilizing a double-walled fabric core, but without a peripheral seam located midway between the upper and lower surfaces of the bladder. Instead, the seam is located adjacent to the upper surface of the bladder. Advantages in this design include removal of the seam from the area of maximum sidewall flexing and increased visibility of the interior of the bladder, including the connecting yarns.

Fluid systems may also be incorporated into footwear sole structures to achieve a variety of benefits, including enhanced cushioning, improved fit, or ventilation of the upper. With respect to cushioning fluid systems, U.S. Pat. Nos. 5,558,395 and 5,937,462 to Huang disclose systems that utilize ambient air to pressurize one or more bladders located within the midsole. One-directional valves, also referred to as check valves, permit a fluid to enter a pump or fluid system but prevent, or check, fluid flow in the opposite direction. U.S. Pat. No. 4,446,634 to Johnson et al. and U.S. Pat. No. 5,794,361 to Sadler disclose self-contained fluid systems that include two bladders in fluid communication. The bladders are joined by conduits that include valves for directing fluid flow. With respect to ventilation, U.S. Pat. No. 6,085,444 to Cho discloses an article of ventilated footwear having a series of bladders and one-directional valves that draw outside air into the system and then discharge the air into the upper, thereby reducing or eliminating the presence of moisture in the area immediately surrounding the foot.

The fluid systems discussed above utilize a variety of valve types to direct fluid flow within the systems. U.S. Pat. No. 5,144,708 to Pekar and U.S. Pat. No. 5,564,143 to Pekar et al. disclose one-directional valves suitable for some fluid system applications. The valves each include two polymer layers connected along opposite sides to form a channel between the layers. The primary mechanism that checks or limits fluid flow is contact between the layers. Accordingly, particulates that become trapped between the layers may prevent the layers from making sufficient contact, thereby decreasing valve functionality. Fluid systems may be manufactured that incorporate a bladder having a double-walled fabric core. Loose fibers or portions of fibers that are present within the core, for example, are one source of particulates that may obstruct the operation of two layer valves.

SUMMARY OF THE INVENTION

The present invention relates to an article of footwear having an upper for receiving a foot of a wearer and a sole structure attached to the upper. The sole structure includes a fluid system having a first component, a second component in fluid communication with the first component, and a filter assembly. The first component is a source of particulates, and the filter assembly is positioned within the fluid system and within a fluid path extending between the first component and the second component. The filter assembly operates to prevent the particulates from the first component from passing through the fluid system and to the second component.

In one embodiment of the invention, the first component is a pressurizable chamber that includes a tensile member, and the second component is a valve. The tensile member may be a pair of spaced fabric layers that are connected together by a plurality of connecting members. The spaced fabric layers are connected to opposite sides of the chamber, thereby preventing outward movement of the sides of the chamber. In the absence of the filter assembly, particulates from the tensile member have the potential to enter the valve and hinder the operation of the valve. The filter assembly, however, prevents the particulates from entering the valve. In other embodiments of the invention, the first component may be any other portion of the fluid system that operates as a source of particuates. Similarly, the second component may be any fluid system component that is adversely affected by the particulates.

The valve and the filter assembly may be located within a conduit that is attached to the chamber. In some embodiments of the present invention, the conduit includes two flanged portions and the filter assembly is located between the flanged portions. The filter assembly may also include a carrier to which the filter membrane is attached. Alternately, the filter may be secured to opposite sides of the conduit, which may be formed through a flat-sheet welding process, so as to extend across the conduit.

The advantages and features of novelty characterizing the present invention are pointed out with particularity in the appended claims. To gain an improved understanding of the advantages and features of novelty, however, reference may be made to the following descriptive matter and accompanying drawings that describe and illustrate various embodiments and concepts related to the invention.

DETAILED DESCRIPTION OF THE DRAWINGS

The foregoing Summary of the Invention, as well as the following Detailed Description of the Invention, will be better understood when read in conjunction with the accompanying drawings.

DETAILED DESCRIPTION OF THE INVENTION

The following discussion and the accompanying figures disclose an article of footwear that incorporates a fluid system in accordance with the present invention. The discussion and figures relate, more particularly, to a fluid system with an internal filter that is particularly suited for use with footwear and other types of athletic equipment. The concepts presented in the following discussion and figures, however, may also have applications in the medical, automotive, and aerospace industries, for example. Accordingly, the present invention is intended to encompass filter assemblies and fluid systems incorporating filter assemblies that are suitable for a wide range of products in diverse areas of manufacture.

Figure 1:
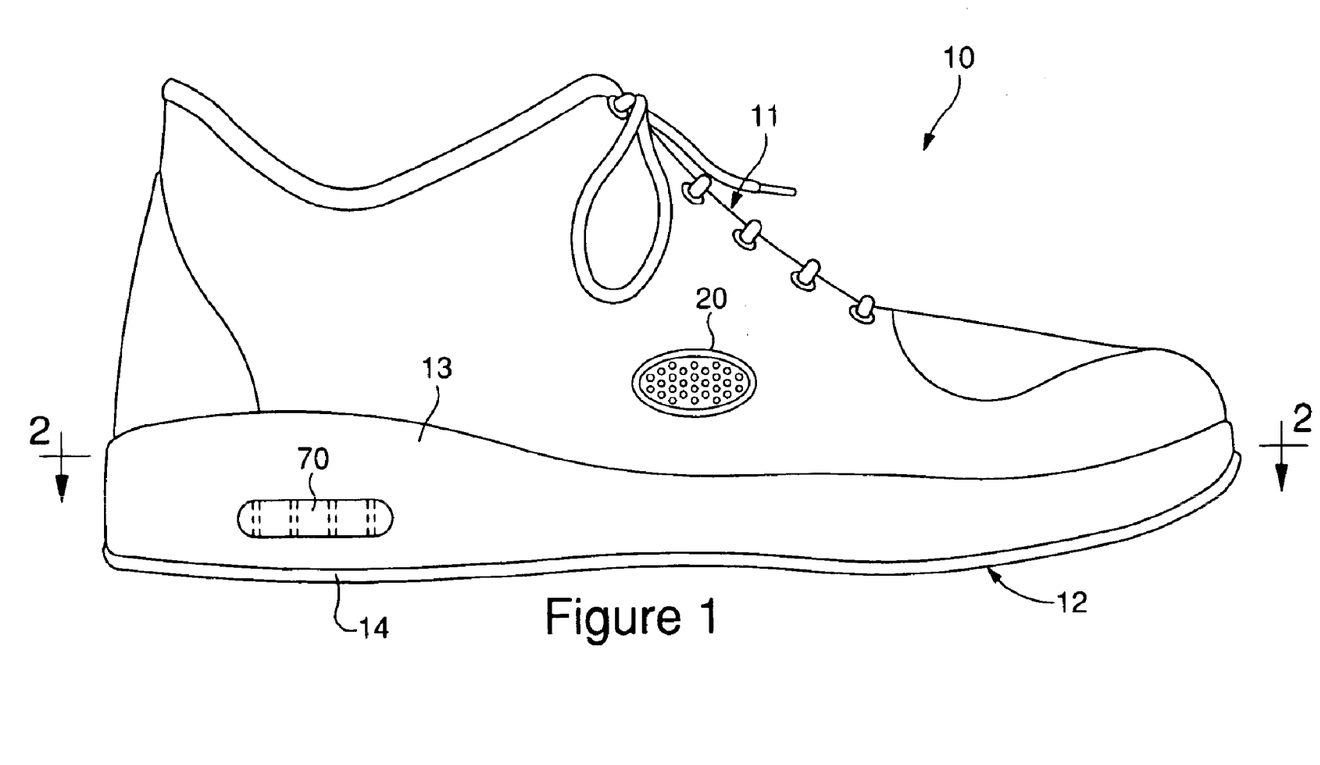
FIG. 1 is an elevational view of an article of footwear that incorporates a fluid system in accordance with the present invention.

Referring to FIG. 1, an article of footwear 10 that includes an upper 11 and a sole structure 12 is shown. Article of footwear 10 is depicted as an article of athletic footwear, particularly a running shoe, but may be any style of footwear within the scope of the present invention, including a tennis shoe, basketball shoe, cross-training shoe, sandal, dress shoe, hiking boot, ski boot, or in-line skate, for example. Upper 11 may be of any conventional design and is attached to sole structure 12 through methods that are well-established in the art. The elements of sole structure 12 include a midsole 13 and an outsole 14. Sole structure 12 may also include an insole (not depicted) that is located within upper 11. One skilled in the relevant art will recognize that the configuration of the various elements of sole structure 12 may vary depending upon the specific style of footwear 10.

Figure 2:
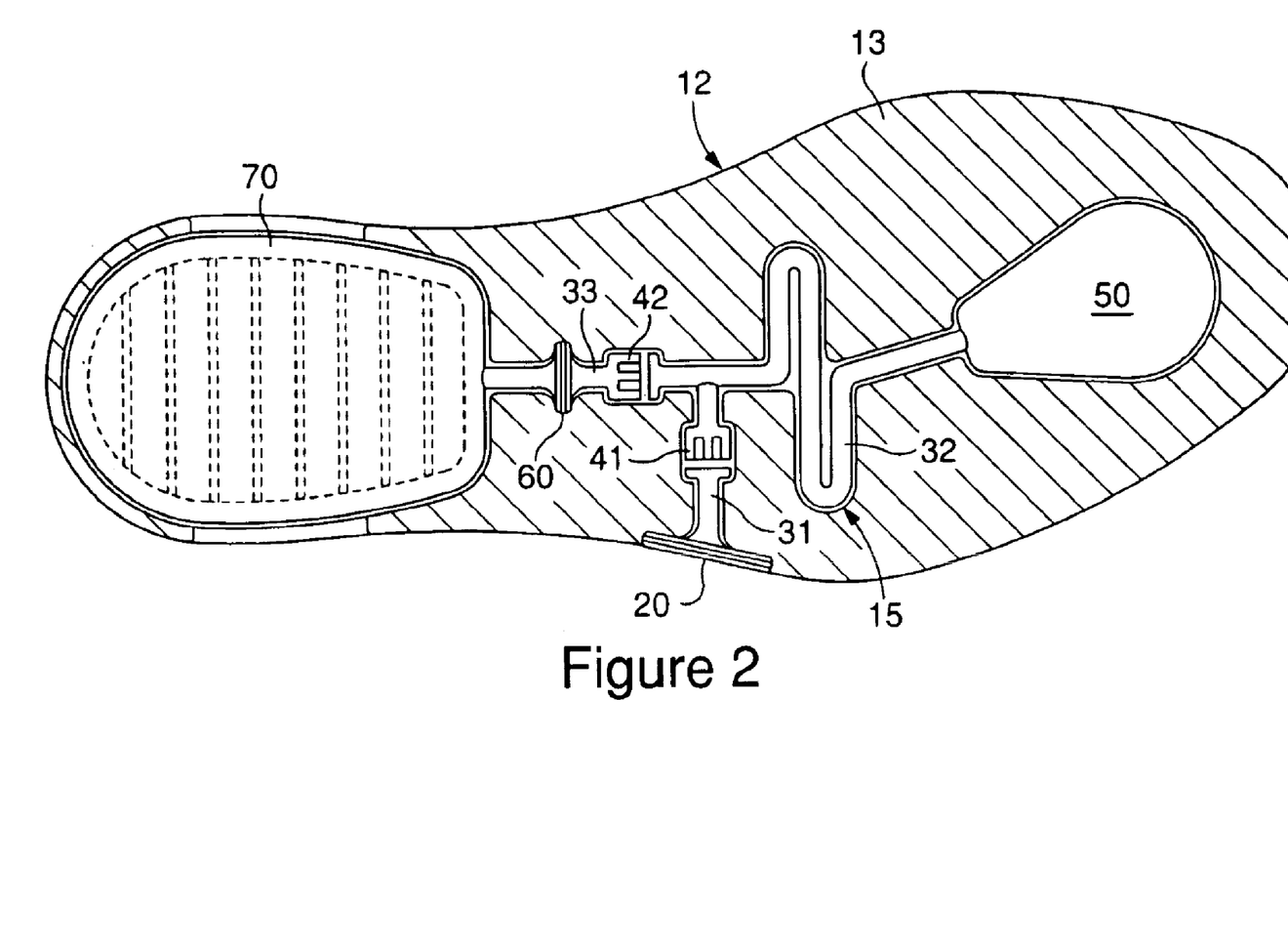
FIG. 2 is a cross-sectional view of the article of footwear depicted in FIG. 1, as defined by line 2—2.

A fluid system 15 is encapsulated within midsole 13, as depicted in FIG. 2. Fluid system 15 is intended to provide an example of a fluid system embodying concepts related to the present invention. A plurality of other fluid systems having various components and varying degrees of complexity are also intended to fall within the scope of the present invention. The primary elements of fluid system 15 are an inlet filter assembly 20, three conduits 31–33, a pair of valves 41 and 42, a pump chamber 50, an internal filter assembly 60, and a pressure chamber 70. Fluid system 15 also includes a fluid, which may be air, for example. In other fluid systems, the fluid may be nitrogen or other gasses, and may be a liquid such as water.

The fluid is drawn into fluid system 15 through inlet filter assembly 20, which limits particulates and water from also entering fluid system 15. The fluid then flows through conduit 31, valve 41, and conduit 32 to enter pump chamber 50. During walking or running, the heel portion of an article of footwear initially strikes the ground and the article of footwear then rolls forward such that the forefoot portion of the article of footwear makes contact with the ground. As depicted in FIG. 2, pump chamber 50 is generally located within the forefoot portion of article of footwear 10 and pressure chamber 70 is generally located with the heel portion of article of footwear 10. Accordingly, pump chamber 50 is compressed during the portion of the walking or running cycle wherein the forefoot portion of article of footwear 10 contacts the ground. When the compression of pump chamber 50 is such that the pressure of the fluid within pump chamber 50 exceeds the pressure of the fluid in pressure chamber 70, plus a differential pressure that represents pressure losses within fluid system 15, a portion of the fluid within pump chamber 50 is transferred to pressure chamber 70 by passing through conduit 32, valve 42, conduit 33, and internal filter assembly 60. Increases in the fluid pressure within pressure chamber 70 may be utilized, for example, to attenuate impact forces or absorb energy that is associated with the heel portion of article of footwear 10 making contact with the ground. The pressure losses mentioned above may arise due to the constrictions of conduits 32 and 33, an opening pressure of valve 42, and the resistance of internal filter assembly 60, for example.

Inlet filter assembly 20 prevents water, other liquids, and a variety of particulates from hindering the operation of various system components, such as valves 41 and 42, internal filter assembly 60, and pressure chamber 70. If permitted to enter the system, particulates, for example, could collect around valve 41 such that air is permitted to freely return from pump chamber 50 to inlet filter assembly 20, thereby escaping to the atmosphere. In addition, water and particulates could collect in pressure chamber 70 and become visible from the exterior of article of footwear 10, thereby decreasing the aesthetic properties of article of footwear 10. If water were permitted to enter and collect in pump chamber 50, pressure chamber 70, or other portions of fluid system 15, the weight of article of footwear 10 may increase significantly. Furthermore, particulates may act as an abrasive that wears away portion of the system, thereby decreasing durability. Accordingly, inlet filter assembly 20 acts to prevent the entry of liquids and particulates that may have a detrimental effect upon fluid system 15.

One suitable material for the filter within inlet filet assembly 20 is polytetrafluoroethylene (PTFE), which may be deposited on a substrate material. PTFE exhibits the required characteristics and is suitably durable when attached to a substrate such as non-woven polyester. A variation upon the standard formulation of PTFE is expanded polytetrafluoroethylene (ePTFE) which is manufactured by, for example, W.L. Gore & Associates. In addition to PTFE, other suitable materials for the filter within inlet filter assembly 20 include high density polyethylene, ultrahigh molecular weight polyethylene, polyvinylidene-fluoride, polypropylene, and certain ceramic filter materials. Knit materials, woven materials, nonwoven materials, laminate structures consisting of one or more differing filter materials, and paper may also be suitable. In addition, the filter may be formed of a solid, porous material.

Valves 41 and 42 may be any type of valve that performs in accordance with the design requirements of system 15. Valves structures that may be utilized for valves 41 and 42 include, for example, duckbill valves manufactured by Vernay Laboratories, Inc. and the two-layer polymer valves disclosed in U.S. Pat. No. 5,144,708 to Pekar and U.S. Pat. No. 5,564,143 to Pekar et al. Both types of valves are generally considered one-directional valves that permit fluid flow in a first direction, but limit fluid flow in a second, opposite direction. With respect to fluid system 15, valve 41 permits fluid flow in the direction from inlet filter assembly 20 to pump chamber 50, and valve 42 permits fluid flow in the direction from pump chamber 50 to pressure chamber 70. Valves 41 and 42, however limit fluid flow in opposite directions. Depending upon the specific characteristics that a fluid system is intended to impart, valves that permit fluid flow in both directions may also be utilized. In addition to the valve structures disclosed above, valves 41 and 42 may also have the configuration of a valve 100, which is described following a more detailed discussion of fluid system 15.

Figure 3:
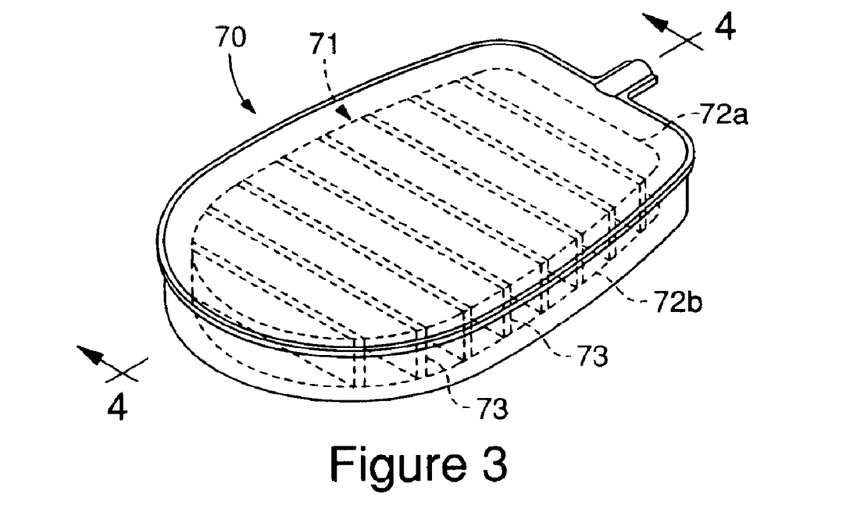
FIG. 3 is a perspective view of a pressure chamber that incorporates a tensile member.
Figure 4:
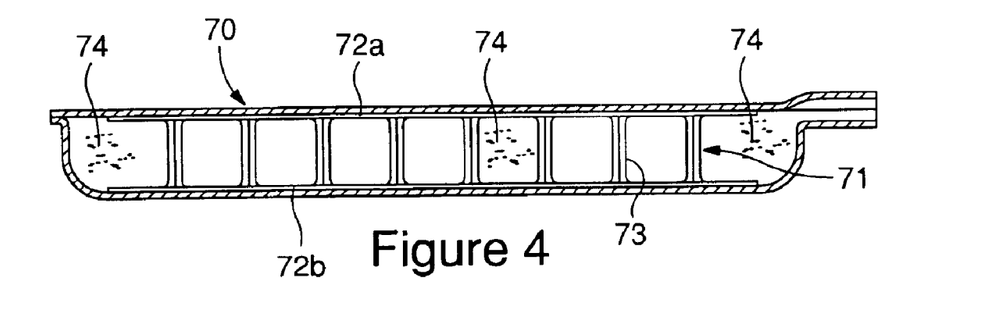
FIG. 4 is a cross-sectional view of the pressure chamber depicted in FIG. 3, as defined by line 4—4.

Pressure chamber 70 incorporates a tensile member 71, as depicted in FIGS. 3 and 4, having a first sheet 72a that is normally spaced apart from a second sheet 72b by a plurality of connecting members 73. Connecting members 73, which extend between first sheet 72a and second sheet 72b in order to restrain outward movement of sheets 72a and 72b, may be formed of drop yarns that each include multiple tensile filaments anchored to sheets 72a and 72b. One method of manufacturing tensile member 71 is through double needle bar Raschel knitting. A portion of sheets 72a and 72b may be formed of air-bulked or otherwise texturized yarn, such as false twist texturized yarn having a combination of Nylon 6,6 and Nylon 6. Connecting members 73 may be formed of a similar material.

Connecting members 73 may be arranged in rows that are separated by gaps. The use of gaps provides tensile member 71 with increased compressibility in comparison with tensile members formed of double-walled fabrics that utilize continuous connecting yarns. The gaps may be formed during the double needle bar Raschel knitting process by omitting connecting yarns on certain predetermined needles in the warp (wale) direction. Knitting with three needles in and three needles out produces a suitable fabric with rows of connecting members 73 being separated by gaps. Other knitting patterns of needles in and needles out can be used, such as two in and two out, four in and two out, two in and four out, or any combination thereof. Also, the gaps may be formed in both a longitudinal and transverse direction by omitting needles in the warp direction or selectively knitting or not knitting on consecutive courses. For additional information regarding the structure and manufacture of tensile member 71, see U.S. Pat. Nos. 4,906,502 and 5,083,361, both to Rudy, and U.S. Pat. Nos. 5,993,585 and 6,119,371, both to Goodwin et al, which are also discussed in the Description of Background Art section.

Whether manufactured through the double needle bar Raschel knitting process or another manufacturing processes, non-attached or free sections of yarn or other particulates 74 may be present within pressure chamber 70. In addition, repeated compressions of pressure chamber 70 may cause portions of individual fibers to fracture or become dislodged from tensile member 71, thereby increasing the density of particulates 74 within pressure chamber 70. In the absence of internal filter assembly 60, such particulates 74 may pass through conduit 33 and impede the operation of valve 42, for example. The particulates may also pass through valve 42 and impede the operation of valve 41.

In general, two portions of valves 41 and 42 make contact in order to prevent fluid flow. As discussed in the Description of Background Art section, the valves disclosed in U.S. Pat. No. 5,144,708 to Pekar and U.S. Pat. No. 5,564,143 to Pekar et al. are formed of two polymer layers that are attached along opposite sides to form a channel between the layers and the primary mechanism that checks or limits fluid flow is contact between the layers. Similar concepts govern the manner in which the Vernay Laboratories, Inc. duckbill valves and valve 100, which is described in the following material, restricts fluid flow. Accordingly, particulates 74 from tensile member 71 that become lodged between portions of valves 41 and 42 may prevent contact, thereby restricting the fluid checking ability of valves 41 and 42. To prevent particulates 74 from obstructing the operation of valves 41 and 42, internal filter assembly 60 may be positioned in conduit 33 and between pressure chamber 70 and valves 41 and 42.

Figures 5, 6, 7, 8:
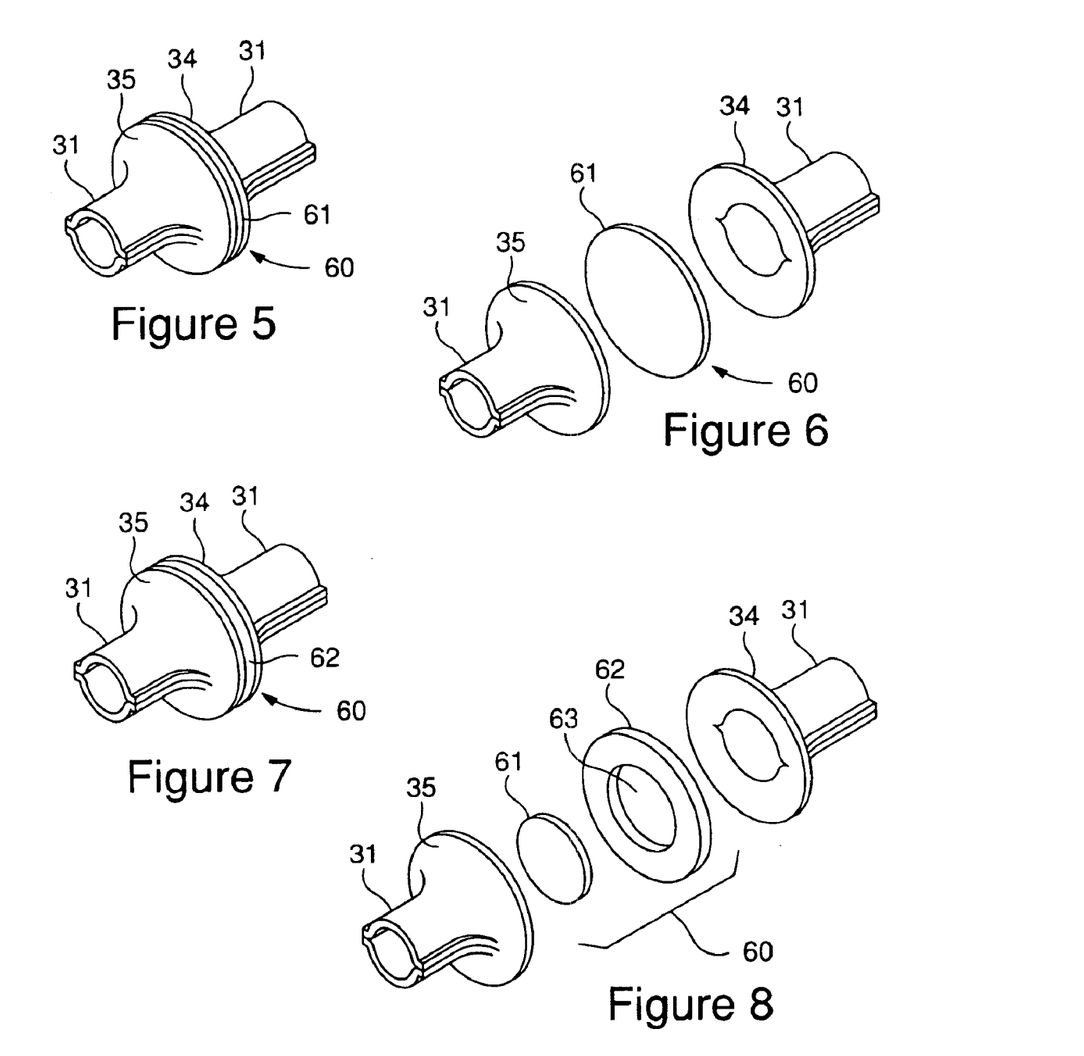
FIG. 5 is a perspective view of a portion of the fluid system depicted in FIG. 2 that includes a first filter assembly configuration.
FIG. 6 is an exploded view of the portion of the fluid system depicted in FIG. 5.
FIG. 7 is a perspective view of a portion of the fluid system depicted in FIG. 2 that includes a second filter assembly configuration.
FIG. 8 is an exploded view of the portion of the fluid system depicted in FIG. 7.

The specific configuration of internal filter assembly 60 may vary considerably within the scope of the present invention. A first configuration of internal filter assembly 60 is depicted in FIGS. 5 and 6 and includes a filter membrane 61 that is positioned between two flanged portions 34 and 35 of conduit 33. In order to integrate filter membrane 61 into conduit 33, filter membrane 61 is located between flanged portions 34 and 35 and the three components are bonded together such that the fluid contained by fluid system 15 may neither enter nor exit fluid system 15 through the bonded area. This configuration does, however, permit the fluid within conduit 33 to move from flanged portion 34 to flanged portion 35 by passing through filter membrane 61.

A variety of techniques may be utilized to form the bond between flanged portion 34 and flanged portion 35, including radio frequency (RF) bonding, thermal contact bonding, laser bonding, ultrasonic bonding, infrared bonding, chemical bonding and adhesive bonding, for example. In RF bonding, one or more RF electrodes contact and compress the desired welding areas. The RF electrodes are then activated such that the area of contact is exposed to a specific level of RF energy for a predetermined period of time. The RF energy is absorbed by flanged portion 34 and flanged portion 35 and the temperature of flanged portion 34 and flanged portion 35 rises until melting occurs at the interface between flanged portion 34 and flanged portion 35. Intermingling of the molten material coupled with subsequent cooling forms a bond at the interface between flanged portion 34 and flanged portion 35, thereby securing the position of filter assembly 60.

The materials from which filter membrane 61 may be formed should conform to general concepts that relate to fluid flow rate, particulate size, and operating environment. With regard to fluid flow rate, filter membrane 61 should permit the fluid to flow through conduit 33 at a rate that is sufficient to inflate pressure chamber 70. The material selected for filter membrane 61 should also block particulates 74 that may decrease the performance of valves 41 and 42. In general, the smallest visible particle has a size of approximately 50 microns; bacteria ranges in size from 0.4 microns to 11 microns; and certain endotoxins average 0.01 microns. An inverse relationship generally exists between the particulate size that may freely pass through a filter material and the fluid flow rate. Accordingly, a filter material that blocks relatively small particles typically has a low fluid flow rate. With respect to the present invention, a suitable particulate blockage size for filter membrane 61 may be greater than 0.5 microns. Finally, filter membrane 61 should operate under a variety of environmental conditions. In fluid systems where water or other liquids may be present, filter membrane 61 may be selected to have hydrophobic or oleophobic properties. In addition, filter membrane 61 should be able to function properly following exposure to temperature extremes, perhaps ranging from negative 10 degrees Fahrenheit to positive 175 degrees Fahrenheit.

In light of the considerations discussed above, filter membrane 61 may be formed from many of the same materials that are utilized within inlet filter assembly 20, including textiles, non-woven materials, polytetrafluoroethylene, laminate structures of differing materials, paper, and specially coated fabrics. Many of the components that comprise fluid system 15, including conduit 33, may be formed from thermoplastic polyurethane or other materials that may be efficiently bonded through RF bonding or the other techniques discussed above. Accordingly, filter membrane 61 may also be formed from a thermoplastic material, such as non-woven polyurethane, to facilitate bonding between filter membrane 61 and flanged portions 34 and 35, thereby permitting filter membrane 61 to be efficiently integrated into fluid system 15.

One purpose of flanged portions 34 and 35 is to provide conduit 33 with a greater cross-sectional area in the region of internal filter assembly 60, thereby permitting filter assembly 60 to be integrated into conduit 33. As discussed above, filter membrane 61 may be selected to have a specific fluid flow rate. In general, greater fluid flow may be achieved by increasing the surface area of filter membrane 61. Accordingly, the size of flanged portions 34 and 35 may be selected to accommodate an internal filter assembly 60 having an appropriately-sized filter membrane 61. In fluid systems where the conduit has sufficient cross-sectional area to accommodate internal filter assembly 60, flanged portions 34 and 35 may be omitted.

In the configuration depicted in FIGS. 5 and 6, filter membrane 61 is located between flanged portions 34 and 35 and bonded directly to flanged portions 34 and 35. Circumstances may arise, however, where it is not desirable or possible to bond filter membrane 61 directly to flanged portions 34 and 35. For example, the material selected for filter membrane 61 may not be amenable to the bonding process selected for joining flanged portions 34 and 35. In this situation, filter membrane 61 may be attached to a carrier 62, as depicted in FIGS. 7 and 8, which is compatible with the bonding process for joining flanged portions 34 and 35. Carrier 62 may also be used to protect filter membrane 61 or provide a semi-rigid structure that surrounds filter membrane 61, for example. One or more apertures 63 may be formed in carrier 62 in order to permit fluid to flow through carrier 62.

Another purpose of carrier 62 may be to provide a mechanical connection for flanged portions 34 and 35. As disclosed above, flanged portions may be bonded together or bonded to carrier 62. In some fluid systems, however, carrier 62 may be designed to mechanically connect flanged portions 34 and 35.

Configurations involving a filter membrane 61 that is positioned between flanged portions 34 and 35, as depicted in FIGS. 5–8, are intended to demonstrate one manner in which internal filter assembly 60 may be incorporated into the present invention. In some fluid systems, conduits may be manufactured through a two-sheet process wherein two substantially parallel bonds are formed between two sheets of thermoplastic material, thereby forming a conduit between the sheets and between the bonds. When manufactured through the two-sheet process, internal filter assembly 60 may be located between the sheets prior to bonding. When incorporating internal filter assembly 60 into a conduit 33 that is formed through a two-sheet process, one edge of filter membrane 61 may be attached to one sheet and an opposite edge of filter membrane 61 may be attached to the other sheet. As pressurized fluid enter conduit 33, the fluid will inflate conduit 33 and filter membrane 61 will extend across the fluid passage.

Internal filter assembly 60 may also be positioned in the inlet to pressure chamber 70, rather than in conduit 33. This configuration ensures that particulates 74 from tensile member 71 remain entirely within pressure chamber 70 rather than entering a portion of conduit 33. Accordingly, internal filter assembly 60 and the manner in which internal filter assembly 60 is incorporated into a fluid system may vary considerably within the scope of the present invention.

Figure 9:
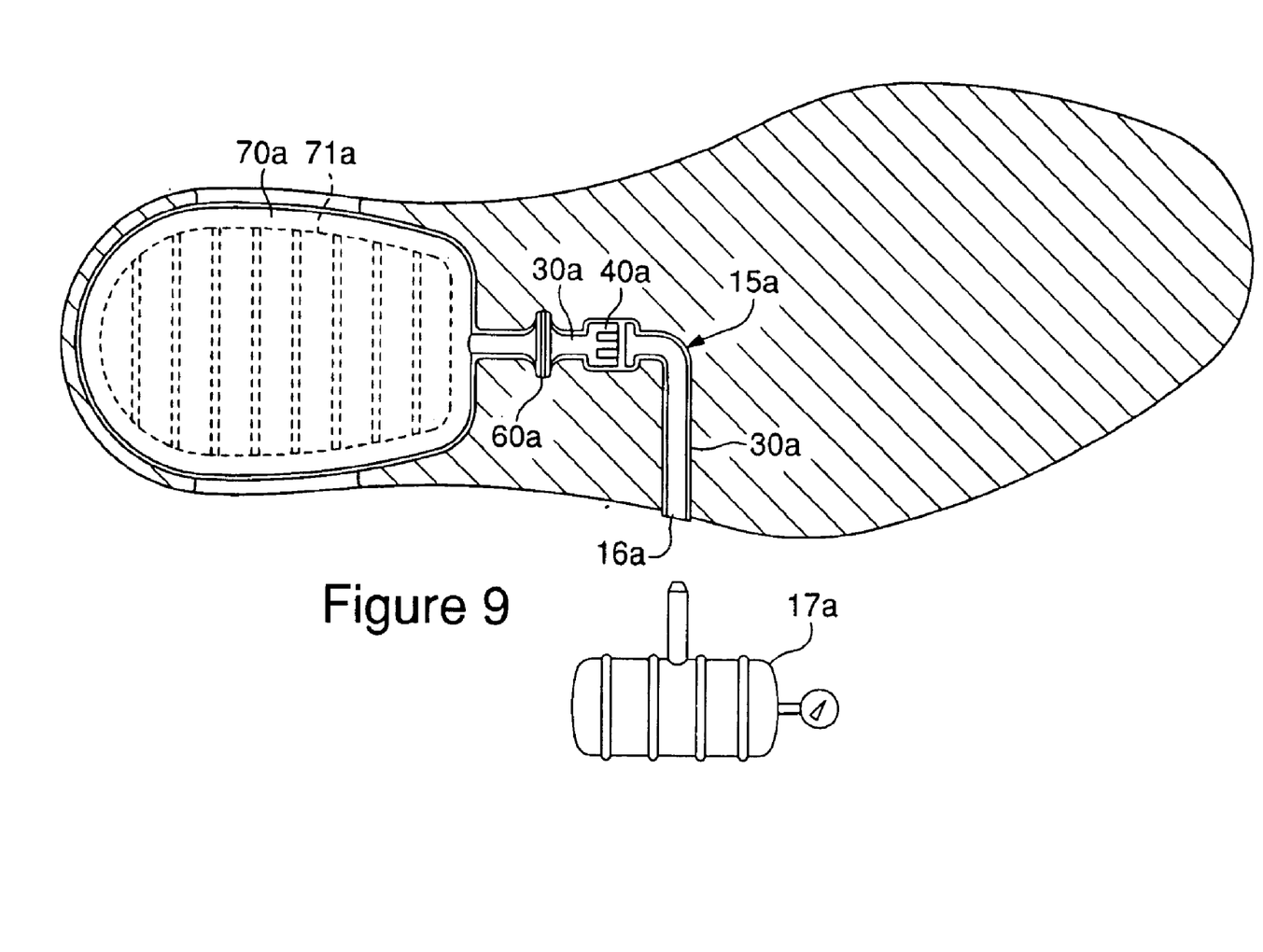
FIG. 9 is a cross-sectional view, as in FIG. 2, that depicts an alternate fluid system configuration.

A plurality of other fluid systems, are also intended to fall within the scope of the present invention. Fluid system 15, therefore, is merely intended to provide an example of a fluid system suitable for the present invention. A second exemplar fluid system 15a is depicted in FIG. 9. Fluid system 15a includes a conduit 30a, a valve 40a and a filter assembly 60a that are located within conduit 30a, and a pressure chamber 70a that includes a tensile member 71a. In addition, system 15a includes an inlet 16a located in an end of conduit 30a. Inlet 16a may be configured to connect with an external pressure source 17a, such as a pump or compressor. As with system 15, the purpose of filter assembly 60a is to prevent particulates generated within tensile member 71a from obstructing the operation of valve 40a.

The structure of valve 100 will now be discussed in greater detail. Valve 100 may be utilized as either or both of valves 41 and 42 to regulate the fluid flow within fluid system 15. Valve 100 may also be utilized as valve 40a to regulate the fluid flow within fluid system 15a. Valve 100 is depicted in FIG. 10 and includes a first valve layer 110a and a second valve layer 110b that are positioned between a first substrate layer 120a and a second substrate layer 120b. With respect to fluid system 15, substrate layers 120 are analogous to polymer layers that may form conduit 30. First valve layer 110a and second valve layer 110b are bonded together along opposite sides to form two channel welds 130 and define a channel 140 positioned between valve layers 110 and between channel welds 130. Channel 140 includes an inlet 142 and an outlet 144. Inlet 142 is biased in the open position by two inlet weld beads 146 formed of polymer material that collects in inlet 142 and adjacent to channel welds 130 during the bonding of first valve layer 110a and second valve layer 110b. Outlet 144 is located opposite inlet 142 and may be formed of unbonded portions of valve layers 110. Each valve layer 110 includes an outer surface 112 and an opposite inner surface 114. With regard to valve layer 110a, an outer surface 112a lies adjacent to substrate layer 120a and an inner surface 114a that lies adjacent to valve layer 110b. Similarly, valve layer 110b includes an outer surface 112b that lies adjacent to substrate layer 120b and an opposite inner surface 114b that lies adjacent to valve layer 110a.

Valve 100 also includes two substrate welds 150 that attach valve layers 110 to substrate layers 120. More specifically, substrate welds 150 attach valve layer 110a to substrate layer 120a and attach valve layer 110b to substrate layer 120b. As depicted in FIG. 10, substrate welds 150 are located adjacent to inlet 142. Substrate welds 150 may also be positioned adjacent to other portions of valve 100.

Figure 10A:
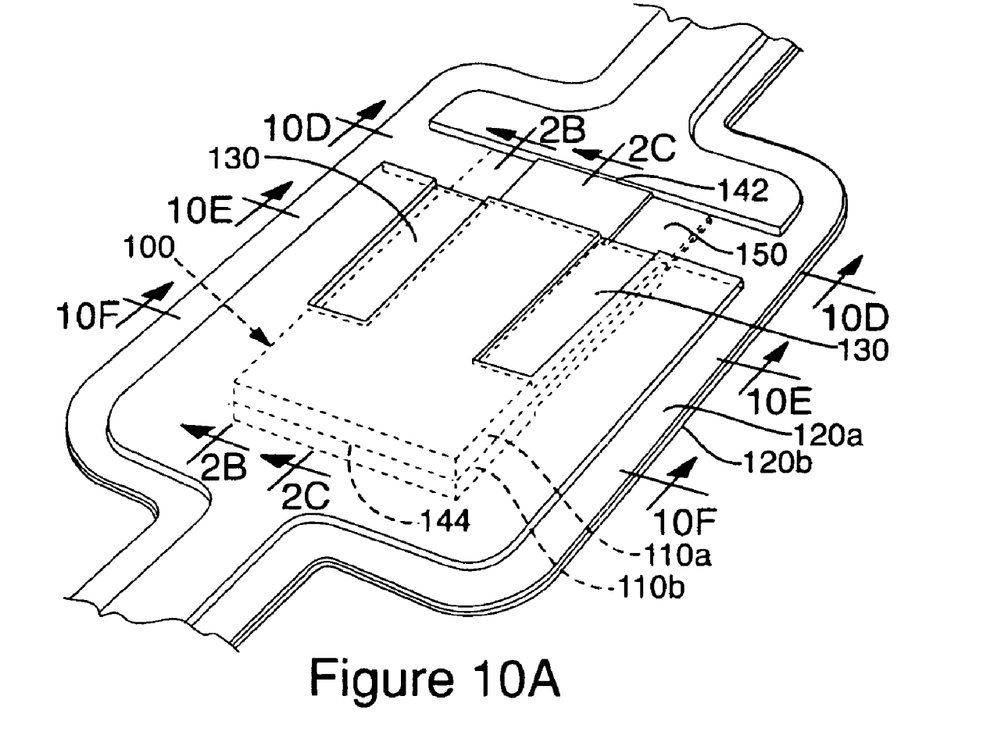
FIG. 10A is a perspective view of a valve suitable for use in the fluid system.
Figure 10B:
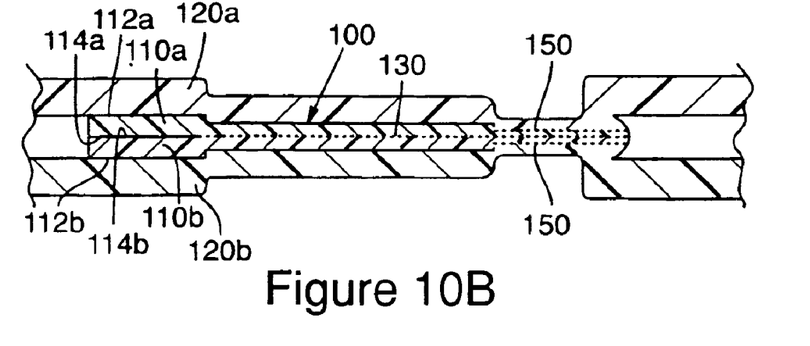
FIG. 10B is a first cross-sectional view of the valve, as defined by line 10B—10B in FIG. 10A.
Figure 10C:
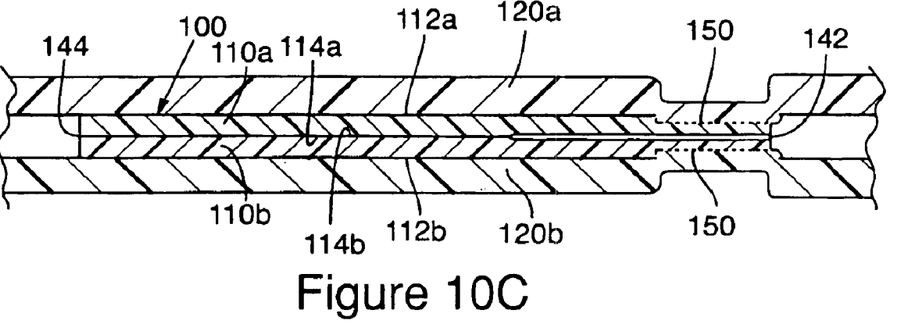
FIG. 10C is a second cross-sectional view of the valve, as defined by line 10C—10C in FIG. 10A.
Figure 10D:
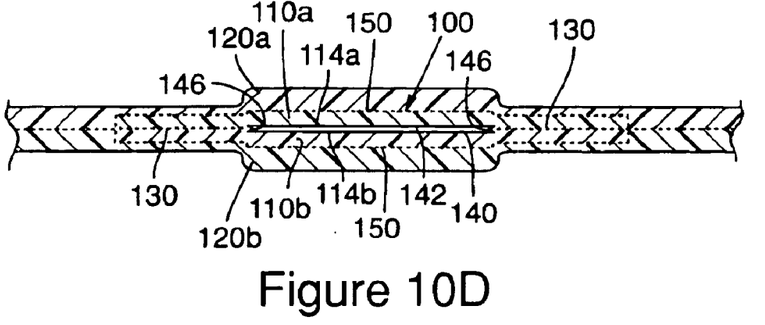
FIG. 10D is a third cross-sectional view of the valve, as defined by line 10D—10D in FIG. 10A.
Figure 10E:
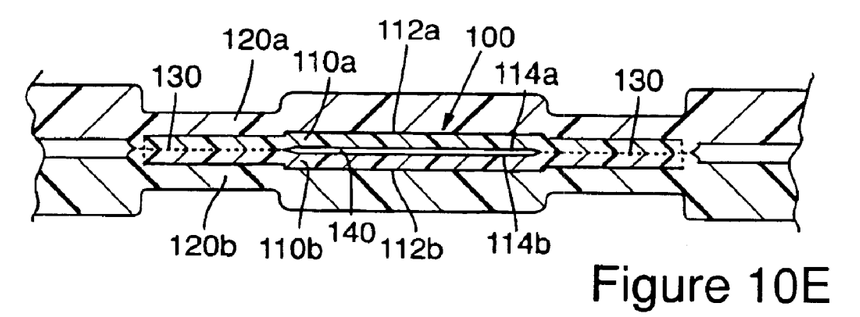
FIG. 10E is a fourth cross-sectional view of the valve, as defined by line 10E—10E in FIG. 10A.
Figure 10F:
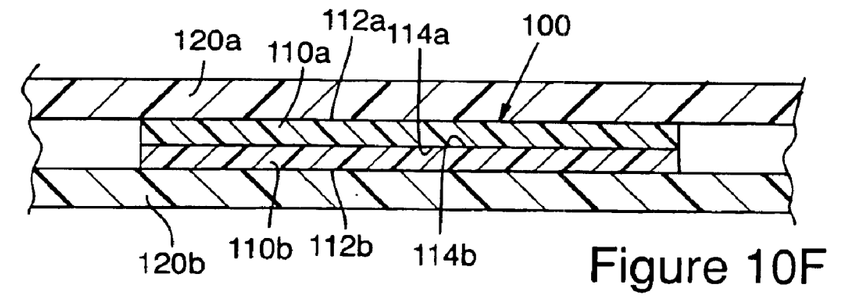
FIG. 10F is a fifth cross-sectional view of the valve, as defined by line 10F—10F in FIG. 10A.
Figure 10G:
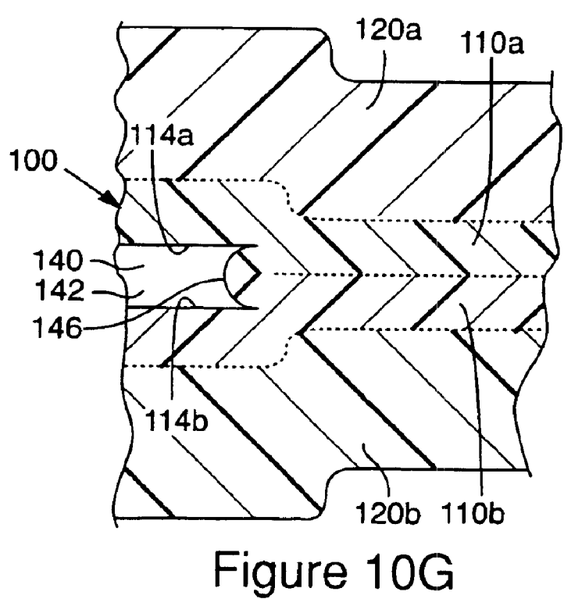
FIG. 10G is an enlarged view of a weld bead depicted in FIG. 10D.

In operation, valve 100 permits fluid flow through channel 140 and in the direction from inlet 142 to outlet 144. Valve 100, however, significantly limits fluid flow in the opposite direction. As noted, inlet weld beads 146 bias inlet 142 in the open position. This configuration ensures that the fluid in conduit 30 may enter at least the portion of channel 140 formed by inlet 142. The primary factor that determines whether the fluid may pass through valve 100 is the relative difference in pressure between the fluid in inlet 142 and the fluid at outlet 144. When the pressure of the fluid in inlet 142 exceeds the pressure of the fluid at outlet 144 plus an opening pressure of valve 100, the force that the fluid in inlet 142 exerts on inner surfaces 114 of valve layers 110 is sufficient to overcome the force that the fluid at outlet 144 exerts on outer surfaces 112, thereby permitting valve layers 110 to separate. When valve layers 110 separate, fluid may pass through channel 140. When the pressure of the fluid in inlet 142 is less than the pressure of the fluid at outlet 144, however, the force that the fluid in inlet 142 exerts on inner surfaces 114 of valve layers 110 is not sufficient to overcome the force that the fluid at outlet 142 exerts on outer surfaces 112, thereby preventing valve layers 110 from separating. When valve layers 110 are not separated, channel 140 is effectively closed to fluid transfer.

Outlet 144 assists in preventing the passage of fluid through valve 100 by ensuring that valve layers 110 make a hermetic contact. Note that channel welds 130 may extend less than the entire length of valve layers 110. Accordingly, outlet 144 may include unbonded portions of valve layers 110. The lack of bonds at outlet 144 permits unobstructed closure at outlet 144, thereby providing the hermetic contact between valve layers 110 that prevents fluid from passing between valve layers 110. Inner surfaces 114 may include a smooth, cohesive surface that facilitates closure of valve 100. Accordingly, the characteristics of inner surfaces 114 may also contribute to the hermetic contact and facilitate one-directional fluid flow through valve 100.

The materials forming valve layers 110 and substrate layers 120 should possess several characteristics. First, the materials should permit welds 130 and 150 to securely form between the various material layers using standard techniques, such as thermal contact, RF energy, laser, and infrared welding. Second, the materials should also be substantially impermeable to fluids, such as air. Third, the materials should possess sufficient flexibility to permit valve 100 to operate as described above. Fourth, the materials should be possess a durability that permits valve 100 to operate through numerous cycles. Fifth, the materials may be chosen to resist hydrolysis, or chemical breakdown due to the presence of water, if water or water vapor may be present around valve 100. Based upon these considerations, suitable materials include thermoplastic polyurethane, urethane, polyvinyl chloride, and polyethylene. When valve 100 is formed of thermoplastic polyurethane, a suitable thickness for valve layers 110 is 0.018 inches, but may range from 0.004 inches to 0.035 inches, for example. Similarly, a suitable thickness for substrate layers 120 is 0.030 inches, but may range from 0.015 inches to 0.050 inches, for example. The thickness of valve layers 110 and the thickness of substrate layers 120 may depart from the ranges listed above, however, depending upon the specific application for valve 100, the materials and manufacturing methods utilized, and the properties that valve 100 is intended to impart to the fluid system.

A benefit to locating substrate welds 150 adjacent to inlet 142 lies in the relatively large area of outer surfaces 112 that are exposed to the fluid at outlet 144. As noted above, when the pressure of the fluid in inlet 142 is less than the pressure of the fluid at outlet 144, the force that the fluid in inlet 142 exerts on inner surface 114 of valve layers 110 is not sufficient to overcome the force that the fluid at outlet 144 exerts on outer surfaces 112, thereby preventing valve layers 110 from separating and preventing the flow of fluid through valve 100. By configuring the position of valve layers 110 such that a relatively large area of outer surfaces 112 are exposed to the fluid at outlet 144, the area of contact between inner surfaces 114 increases proportionally. The primary mechanism that prevents fluid from passing through valve 100 is the hermetic contact properties of inner surfaces 114. Accordingly, increased efficiency is achieved by having a relatively large portion of outer surfaces 112 exposed to the fluid at outlet 144.

As an alternative, valve 100 may be formed from a single valve layer 110 that is bonded with one of the substrate layers 120 to form channel welds 130. Accordingly, channel 140 may be formed between channel welds 130 and between the valve layer 110 and the substrate layer 120. The alternative valve 100 operates in a manner that is substantially similar to the operation of valve 100. In addition, valve 100 may be formed such that channel welds 130 extend around and enclose outlet 144. An aperture may then be formed in one of valve layers 10 to permit the fluid to pass through valve 100. In either alternative embodiment, contact between valve layer 110 and the substrate layer 120 effectively closes valve 100.

As discussed above, when the pressure of the fluid in inlet 142 is less than the pressure of the fluid at outlet 144, the force that the fluid in inlet 142 exerts on inner surfaces 114 of valve layers 110 is not sufficient to overcome the force that the fluid at outlet 142 exerts on outer surfaces 112, thereby preventing valve layers 110 from separating. When valve layers 110 are not separated, channel 140 is effectively closed to fluid transfer. If, however, particulates are positioned within valve 100 and between valve layers 110, the fluid may be able to pass through valve 100 in the direction of outlet 144 to inlet 142. That is, the effectiveness of valve 100 in preventing fluid transfer in the direction from outlet 144 to inlet 142 may be compromised by the presence of particulates 74.

The above discussion relates to the use of a filter to prevent particulates from interfering with the operation of valves. In general, however, a filter may be utilized within a fluid system for a variety of purposes. For example, a filter may be positioned between a particle source, such as tensile member 71, to prevent particulates from interfering with pressure sensors within the fluid system, to prevent particulates from collecting in visible areas of the fluid system, or to prevent particulates from blocking relatively small conduits within the fluid system. The particulates that the filter is intended to block may also come from a variety of particulate sources, in addition to tensile member 71. For example, blocking materials may be utilized within a fluid system to prevent specific polymer components from bonding together. As the fluid system is utilized, the blocking materials may become particulates that hinder the operation of valves, for example. Accordingly, a filter may be utilized to separate portions of the fluid system that incorporate blocker materials from portions of the fluid system having components that may be affected by particulates. Accordingly, the use of an internal filter assembly in accordance with the present invention may be applied to a variety of situations where particulates from a variety of sources within the fluid system may affect the operation of fluid system components.

The present invention is disclosed above and in the accompanying drawings with reference to a variety of embodiments. The purpose served by the disclosure, however, is to provide an example of the various features and concepts related to the invention, not to limit the scope of the invention. One skilled in the relevant art will recognize that numerous variations and modifications may be made to the embodiments described above without departing from the scope of the present invention, as defined by the appended claims.

That which is claimed is:

1. A fluid system comprising:
   a valve;
   a compressible chamber in fluid communication with the valve, the chamber including a tensile member attached to opposing surfaces of the chamber and extending between the opposing surfaces; and
   a filter assembly positioned within a fluid path extending between the valve and the compressible chamber, the filter assembly preventing particulates from the tensile member from entering the valve.

2. The fluid system of claim 1, wherein the chamber is pressurizable and the tensile member restrains outward movement of the opposing surfaces when the chamber is pressurized.

3. The fluid system of claim 1, wherein the tensile member includes a pair of fabric layers that are spaced apart and connected together by a plurality of connecting members.

4. The fluid system of claim 3, wherein the connecting members are formed of fibers.

5. The fluid system of claim 1, wherein the valve is formed of at least two polymer layers.

6. The fluid system of claim 1, wherein a conduit is connected in fluid communication between the valve and the chamber.

7. The fluid system of claim 6, wherein the filter assembly is located within the conduit.

8. The fluid system of claim 6, wherein the conduit includes two flanged portions, the filter assembly being located between the flanged portions.

9. The fluid system of claim 8, wherein the filter assembly is bonded between the flanged portions.

10. The fluid system of claim 1, wherein the filter assembly includes a filter membrane that is configured to prevent the particulates from passing through the filter membrane.

11. The fluid system of claim 10, wherein the filter assembly includes a carrier, the filter membrane being attached to the carrier.

12. The fluid system of claim 11, wherein the carrier includes at least one aperture to permit fluid flow through the carrier.

13. The fluid system of claim 1, wherein the filter assembly includes a filter membrane that is configured to prevent the particulates having a size greater than 0.5 microns from passing through the filter membrane.

14. The fluid system of claim 13, wherein the filter membrane is formed of polyurethane.

15. The fluid system of claim 13, wherein the filter membrane is a non-woven material.

16. An article of footwear comprising:
    an upper for receiving a foot of a wearer, and
    a sole structure attached to the upper, the sole structure incorporating a fluid system that includes a valve, a compressible chamber in fluid communication with the valve, and a filter assembly, the chamber including a tensile member attached to opposing surfaces of the chamber and extending between the opposing surfaces, and the filter assembly being positioned within the fluid system and within a fluid path extending between the valve and the compressible chamber, the filter assembly preventing particulates from the tensile member from entering the valve.

17. The article of footwear of claim 16, wherein at least a portion of the fluid system is located within a foam midsole of the footwear.

18. The article of footwear of claim 16, wherein the chamber is pressurizable and the tensile member restrains outward movement of the opposing surfaces when the chamber is pressurized.

19. The article of footwear of claim 16, wherein the tensile member includes a pair of fabric layers that are spaced apart and connected together by a plurality of connecting members.

20. The article of footwear of claim 19, wherein the connecting members are formed of fibers.

21. The article of footwear of claim 16, wherein the valve is formed of at least two polymer layers.

22. An article of footwear comprising:
    an upper for receiving a foot of a wearer, and
    a sole structure attached to the upper, the sole structure incorporating a fluid system that includes a first component, a second component in fluid communication with the first component, and a filter assembly, the first component being a source of particulates, and the filter assembly being positioned within the fluid system and within a fluid path extending between the first component and the second component, the filter assembly preventing the particulates from the first component from passing through the fluid system and to the second component.

23. The article of footwear of claim 22, wherein the first component is a pressurizable chamber having a tensile member that restrains opposing surface of the chamber from moving outward when the chamber is pressurized.

24. The article of footwear of claim 23, wherein the tensile member includes a pair of fabric layers that are spaced apart and connected together by a plurality of connecting members.

25. The article of footwear of claim 24, wherein the connecting members are formed of fibers.

26. The article of footwear of claim 22, wherein the second component is a valve formed of at least two polymer layers.

27. The article of footwear of claim 22, wherein the filter assembly includes a filter membrane that is configured to prevent the particulates having a size greater than 0.5 microns firm passing through the filter membrane.

28. The article of footwear of claim 22, wherein the filter assembly includes a filter membrane formed of polyurethane.

29. The article of footwear of claim 22, wherein the filter assembly includes a filter membrane formed of a non-woven material.

30. The article of footwear of claim 22, wherein the fluid path extending between the first component and the second component includes a conduit, the filter assembly being positioned within the conduit.

31. The article of footwear of claim 30, wherein the conduit includes two flanged portions, the filter assembly being located between the flanged portions.

32. The article of footwear of claim 31, wherein the flanged portions are bonded together.

33. A fluid system comprising:
a compressible chamber having a tensile member that is located within the chamber and attached to opposing surfaces of the chamber, the tensile member extending between the opposing surfaces and restraining outward movement of the opposing surfaces;
a conduit in fluid communication with the chamber, the conduit including a first portion and a second portion, the first portion being attached to the chamber, and the second portion being attached to the first portion opposite the chamber such that the first portion is in fluid communication with the second portion;
a valve located adjacent the second portion of the conduit; and
a filter assembly located between the first portion and the second portion of the conduit, the filter assembly being in fluid communication with the chamber and the valve, and the filter assembly including a filter membrane that prevents particulates from the tensile member from the entering the valve.

34. The fluid system of claim 33, wherein the tensile member includes a pair of fabric layers that are spaced apart and connected together by a plurality of connecting members.

35. The fluid system of claim 34, wherein the connecting members are formed of fibers.

36. The fluid system of claim 33, wherein the valve is formed of at least two polymer layers.

37. The fluid system of claim 33, wherein the first portion includes a first flanged portion and the second portion includes a second flanged portion, the filter assembly being located between and attached to the flanged portions.

38. The fluid system of claim 37, wherein the filter membrane is bonded directly to the first flanged portion and the second flanged portion.

39. The fluid system of claim 37, wherein the filter assembly includes a carrier, the filter membrane being attached to the carrier, and the carrier being bonded directly to the first flanged portion and the second flanged portion.

40. The fluid system of claim 39, wherein the carrier includes at least one apart to permit fluid flow through the carrier.

41. The fluid system of claim 33, wherein a pressure source attaches to the second portion opposite the first portion, the pressure source pressurizing the chamber.

42. The fluid system of claim 41, wherein the pressure source is a pump chamber that is permanently attached to the second portion.

43. The fluid system of claim 41, wherein the pressure source is external to the fluid system.

44. The fluid system of claim 33, wherein the filter membrane prevents the particulates having a size greater than 0.5 microns from passing through the filter membrane.

45. The fluid system of claim 33, wherein the filter membrane is formed of polyurethane.

46. The fluid system of clam 33, wherein the filter membrane is a non-woven material.

47. An article of footwear comprising:
an upper for receiving a foot of a wearer, and
a sole structure attached to the upper, the sole structure having a fluid system that includes:
a compressible chamber having a tensile member that is located within the chamber and attached to opposing surfaces of the chamber, the tensile member extending between the opposing surfaces and restraining outward movement of the opposing surfaces;
a conduit in fluid communication with the chamber, the conduit including a first portion and a second portion, the first portion being attached to the chamber, and the second portion being attached to the first portion apposite the chamber such that the first portion is in fluid communication with the second portion;
a valve located adjacent the second portion of the conduit; and
a filter assembly located between the first portion and the second portion of the conduit, the filter assembly being in fluid communication with the chamber and the valve, and the filter assembly including a filter membrane that prevents particulates from the tensile member from the entering the valve.

48. The article of footwear of claim 47, wherein the tensile member includes a pair of fabric layers that are spaced apart and connected together by a plurality of connecting members.

49. The article of footwear of claim 48, wherein the connecting members are formed of fibers.

50. The article of footwear of claim 47, wherein the valve is formed of at least two polymer layers.

51. The article of footwear of claim 47, wherein the first portion includes a first flanged portion and the second portion includes a second flanged portion, the filter assembly being located between and attached to the flanged portions.

52. The article of footwear of claim 51, wherein the filter membrane is bonded directly to the first flanged portion and the second flanged portion.

53. The article of footwear of claim 51, wherein the filter assembly includes a carrier, the filter membrane being attached to the carrier, and the carrier being bonded directly to the first flanged portion and the second fanged portion.

54. The article of footwear of claim 53, wherein the carrier includes at least one aperture to permit fluid flow through the carrier.

55. The article of footwear of claim 47, wherein a pressure source attaches to the second portion opposite the fist portion, the pressure source pressurizing the chamber.

56. The article of footwear of claim 55, wherein the pressure source is a pump chamber that is permanently attached to the second portion.

57. The article of footwear of claim 55, wherein the pressure source is external to the fluid system.

58. The article of footwear of claim 47, wherein at least a portion of the fluid system is located within a midsole of the footwear.

59. The article of footwear of claim 47, wherein the chamber is located in a heel portion of the sole structure.

60. The fluid system of claim 47, wherein the filter membrane prevents the particulates having a size greater than 0.5 microns from passing through the filter membrane.

61. The fluid system of claim 47, wherein the filter membrane is formed of polyurethane.

62. The fluid system of claim 47, wherein the filter membrane is a non-woven material.

63. An article of footwear comprising:
   an upper for receiving a foot of a wearer; and
   a sole structure attached to the upper, the sole structure having a fluid system that includes:
      a first component that is a source of particulates;
      a second component;
      a conduit that places the first component and the second component in fluid communication; and
      a filter assembly located within the conduit, the filter assembly being in fluid communication with the first component and the second component, and the filter assembly including a filter membrane that prevents the particulates from the first component from the entering the second component.

64. The article of footwear of claim 63, wherein the first component is a bladder with a tensile member having a pair of fabric layers that an spaced apart and connected together by a plurality of connecting members.

65. The article of footwear of claim 64, wherein the connecting members are formed of fibers.

66. The article of footwear of claim 63, wherein the second component is valve that is formed of at least two polymer layers.

67. The article of footwear of claim 63, wherein the conduit includes a first flanged portion and a second flanged portion, the filter assembly being located between the flanged portions.

68. The article of footwear of claim 67, wherein the filter membrane is bonded directly to the first flanged portion and the second flanged portion.

69. The article of footwear of claim 67, wherein the filter assembly includes a carrier, the filter membrane being attached to the carrier, and the carrier being bonded directly to the first flanged portion and the second flanged portion.

70. The article of footwear of claim 69, wherein the carrier includes at least one aperture to permit fluid flow through the carrier.

71. The article of footwear of claim 63, wherein at least a portion of the fluid system is located within a midsole of the footwear.

72. The fluid system of claim 63, wherein the filter membrane prevents the particulates having a size greater than 0.5 microns from passing through the filter membrane.

73. The fluid system of claim 63, wherein the filter membrane is formed of polyurethane.

74. The fluid system of claim 63, wherein the filter membrane is a non-woven material.

* * * * *

UNITED STATES PATENT AND TRADEMARK OFFICE
CERTIFICATE OF CORRECTION

PATENT NO. : 6,889,451 B2
DATED : May 10, 2005
INVENTOR(S) : Joel L. Passke et al.

It is certified that error appears in the above-identified patent and that said Letters Patent is hereby corrected as shown below:

Title page,
Item [73], Assignee, change "Mike, Inc." to -- Nike, Inc. --

Signed and Sealed this

Twelfth Day of July, 2005

JON W. DUDAS
*Director of the United States Patent and Trademark Office*